US012046266B1

(12) United States Patent
Guo et al.

(10) Patent No.: US 12,046,266 B1
(45) Date of Patent: Jul. 23, 2024

(54) ENERGY-ASSISTED MAGNETIC RECORDING DATA STORAGE DEVICE WITH ASSISTIVE ENERGY PRE-HEATING FOR WRITING SERVO PATTERNS

(71) Applicant: WESTERN DIGITAL TECHNOLOGIES, INC., San Jose, CA (US)

(72) Inventors: Guoxiao Guo, Irvine, CA (US); Dan Wang, San Jose, CA (US); Yun Hong, San Jose, CA (US); Xiaokun Chew, San Juan Capistrano, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/231,991

(22) Filed: Aug. 9, 2023

Related U.S. Application Data

(60) Provisional application No. 63/522,964, filed on Jun. 23, 2023.

(51) Int. Cl.
*G11B 5/596* (2006.01)
(52) U.S. Cl.
CPC ...... *G11B 5/59661* (2013.01); *G11B 5/59666* (2013.01)
(58) Field of Classification Search
None
See application file for complete search history.

(56) References Cited

U.S. PATENT DOCUMENTS

| | | | | |
|---|---|---|---|---|
| 7,397,622 B1* | 7/2008 | Liikanen | ............... | G11B 5/02 |
| 8,787,125 B1 | 7/2014 | Lee | | |
| 8,922,929 B1* | 12/2014 | Ruan | ............... | G11B 5/6088 |
| | | | | 360/75 |
| 9,019,646 B2 | 4/2015 | Rausch et al. | | |
| 9,117,479 B1* | 8/2015 | Madison | ............. | G11B 5/455 |
| 9,202,506 B1 | 12/2015 | Mader et al. | | |
| 9,472,219 B1* | 10/2016 | Raghunathan | ....... | G11B 5/6076 |
| 9,472,223 B1* | 10/2016 | Mendonsa | ......... | G11B 20/1816 |

(Continued)

OTHER PUBLICATIONS

S. Xiong et al., "Compensation for the Write Start Transient in Heat-Assisted Magnetic Recording," in IEEE Magnetics Letters, vol. 8, pp. 1-4, 2017, Art No. 4508704, doi: 10.1109/LMAG.2017.2746017.

(Continued)

*Primary Examiner* — Fred Tzeng
(74) *Attorney, Agent, or Firm* — Calderon Safran & Wright, PC

(57) ABSTRACT

Various illustrative aspects are directed to a data storage device, comprising one or more disks; an actuator mechanism configured to position one or more heads proximate to a corresponding disk surface of the one or more disks; and one or more processing devices. The one or more processing devices are configured to apply a pre-bias current to the assistive energy emitter at a first value while the selected head is positioned proximate to one or more spiral patterns on the corresponding disk surface. The one or more processing devices are further configured to apply the pre-bias current to the assistive energy emitter at a boosted value while the selected head is not positioned proximate to the one or more spiral patterns, wherein the boosted value is greater than the first value.

20 Claims, 8 Drawing Sheets

(56) References Cited

U.S. PATENT DOCUMENTS

| | | | | |
|---|---|---|---|---|
| 9,502,061 B1* | 11/2016 | Zhu | ............... | G11B 20/10453 |
| 9,620,162 B1* | 4/2017 | Haralson | ............... | G11B 5/012 |
| 9,786,310 B1* | 10/2017 | Richter | ............... | G11B 5/455 |
| 9,842,619 B1 | 12/2017 | Chu et al. | | |
| 10,147,453 B1* | 12/2018 | Chu | ............... | G11B 5/012 |
| 10,381,036 B1* | 8/2019 | Lammers | ............... | G11B 7/126 |
| 10,643,651 B1* | 5/2020 | Rea | ............... | G11B 5/02 |
| 10,657,987 B1 | 5/2020 | Chu et al. | | |
| 11,532,326 B1 | 12/2022 | Laks | | |
| 11,532,330 B1 | 12/2022 | Biskeborn et al. | | |
| 11,587,586 B1* | 2/2023 | Yasuna | ............... | G11B 13/04 |
| 11,587,587 B1* | 2/2023 | Yasuna | ............... | G11B 5/607 |
| 2013/0077453 A1* | 3/2013 | Alex | ............... | G11B 5/455 |
| 2014/0347965 A1* | 11/2014 | Ruan | ............... | G11B 5/6029 |
| | | | | 369/13.26 |
| 2019/0295580 A1* | 9/2019 | Poss | ............... | G11B 5/02 |

OTHER PUBLICATIONS

S. Xiong et al., "Spacing Control in Heat Assisted Magnetic Recording", in IEEE Magnetics TMRC 2018, Aug. 2018, 6 pages. http://tmrc2018.ucsd.edu/Archive/Digest.pdf.

Xiong et al., "Spacing Dependency of Near Field Recording and Its Application," https://www.researchgate.net/publication/328949611_Spacing_Dependency_of_Near_Field_Recording_and_its_Application, Aug. 2018, 4 pages.

Ma et al., "Writing Process Modeling and Identification for Heat-Assisted Magnetic Recording," https://ieeexplore.ieee.org/abstract/document/7575670, Aug. 2016, 8 pages.

* cited by examiner

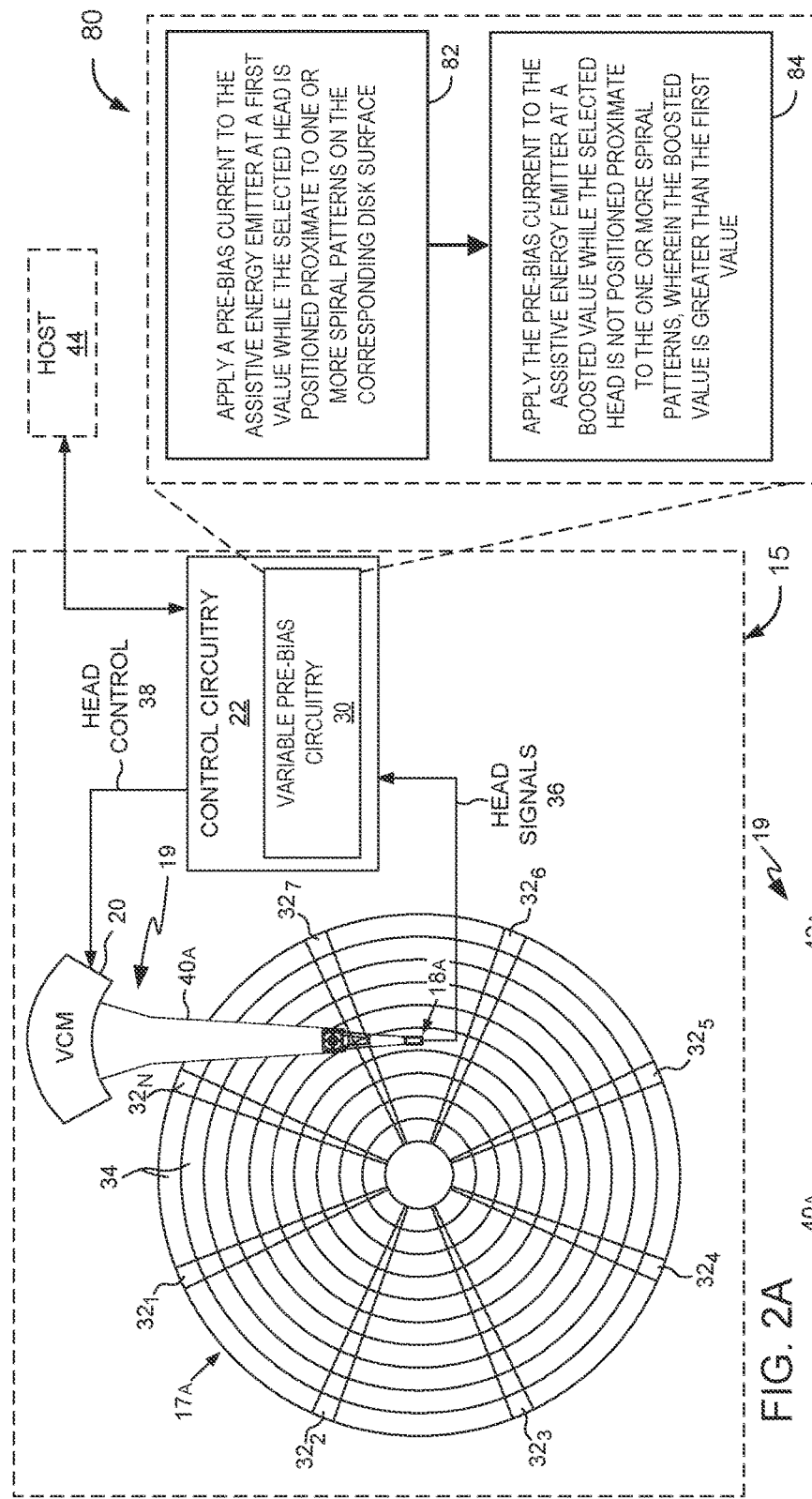
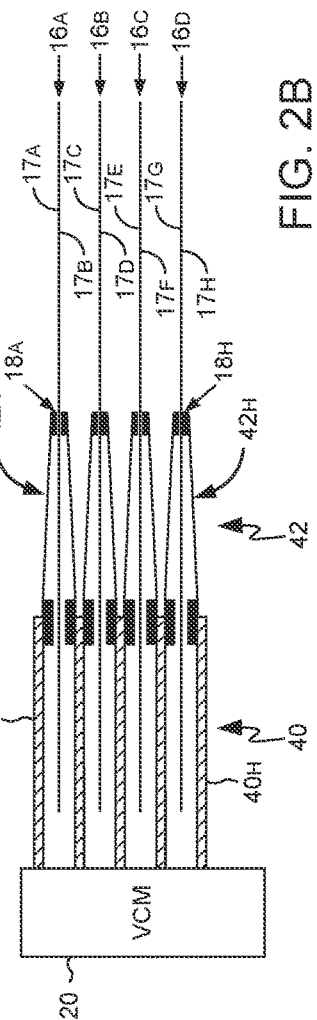
FIG. 2A
FIG. 2B
FIG. 2C

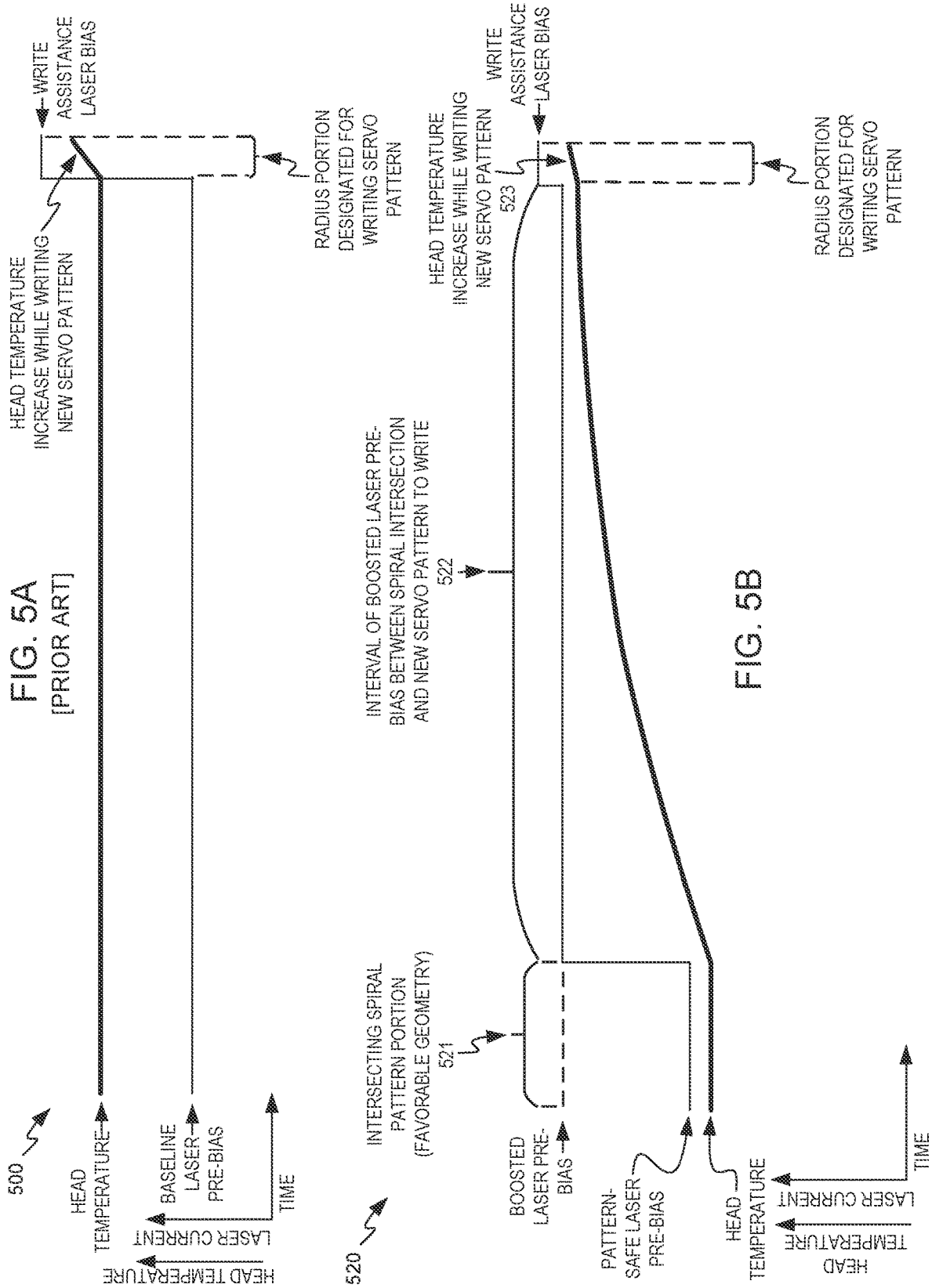

ENERGY-ASSISTED MAGNETIC RECORDING DATA STORAGE DEVICE WITH ASSISTIVE ENERGY PRE-HEATING FOR WRITING SERVO PATTERNS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices, such as hard disk drives with heat-assisted magnetic recording (HAMR) or other energy-assisted magnetic recording, with control circuitry that includes novel and inventive configurations to optimize assistive energy current applied to the assistive energy emitter, such as laser pre-bias current applied to a laser diode, while writing the servo patterns to the disks in the manufacturing process, in accordance with aspects of the present disclosure. Pre-biasing a laser before beginning a write operation can help reduce thermal variation and help ensure stable operation of the laser after beginning the write operation in heat-assisted magnetic recording, thereby providing more predictable operation of the laser and more precise writes of patterns or data. However, if laser pre-bias is too high, it can damage spiral control patterns ("spirals") that the control circuitry uses as necessary initial navigational references in a self-servo write process, when writing navigational servo control patterns to the disk surfaces.

Control circuitry of this disclosure inventively varies the laser pre-bias current applied to the laser diode of a read/write head, based on when the head is in flight positioned between intersections with the spirals, and when the head is in flight proximate to the intersections with the spirals. Control circuitry of this disclosure optimizes higher, boosted laser pre-bias current, in between the spirals, to prepare for writing servo control patterns. Control circuitry of this disclosure thus inventively enables writing servo control patterns with higher precision than is possible in conventional disk drives. Such more precisely written servo control patterns enable higher navigational reliability for the read/write heads and higher data density than are possible in conventional disk drives.

As part of the disk drive manufacturing process, new, blank disk drives must perform a servo write process, such as a self-servo write process, before being usable for data storage. Control circuitry of the disk drive performs a sequence of bootstrap spiral write operations in which it iteratively writes bootstrap reference spiral control patterns, references prior bootstrap spirals in writing more precise bootstrap spirals, and then uses the spirals as position references in writing concentric servo control patterns. The concentric servo control patterns are the final iteration of control patterns that will define the navigational reference control patterns for all subsequent nominal data write operations for the disk drive.

HAMR disk drives enable higher data densities than conventional perpendicular magnetic recording (PMR) heads. In HAMR disk drives, a laser diode comprised in each head heats the corresponding disk surface during write operations to decrease the magnetic coercivity of a high-coercivity magnetic medium of the disk surface, such as iron-platinum nanoparticles that form high-anisotropy, single-domain superparamagnetic grains. The laser heating the high-coercivity medium thereby enables a magnetic field generated by a write coil of the head to magnetize the temporarily heated area of disk surface. The laser may exhibit non-ideal and difficult to predict behavior and vary its intensity of emission non-linearly with respect to applied laser bias current, particularly at the beginning of write operations, such as due to laser mode hops. Addressing non-ideal laser behavior has been a key challenge in advancing HAMR disk drives.

As part of addressing non-ideal laser behavior in HAMR disk drives, control circuitry may apply a laser pre-bias current to the laser diode prior to initiating write operations, to reduce thermal and morphological variations in operating conditions in the head when initiating the write operations. Operating the laser in the read/write head involves complex effects both in the laser diode and on the head-disk spacing fly height between the write element pole tip of the head and the corresponding disk surface. Operating the laser diode involves evolving thermal and optical properties and laser mode hops between emission modes in the laser diode. Thermal energy from operating the laser induces protrusion and modification of the head and evolving changes in the fly height over the course of a write operation, particularly during the initial interval of a write operation. These thermal effects on the laser diode, on head protrusion, and on fly height have typically interfered with nominal write strength and reliable writes, particularly during the initial stage of an attempted write operation. Recent advances in HAMR technologies have included applying an early partial pre-bias current to a laser diode incorporated in a HAMR read/write head, prior to activating the laser at nominal current for write operations. However, laser pre-bias above a certain level may project enough energy onto the disk surface that it may damage or erases pre-existing spiral patterns or servo control patterns or data. In conventional HAMR drives, while writing servo patterns in the self-servo write process, the control circuitry applies laser pre-bias current at a homogenous, conservatively safe value, conservatively below an amplitude that could damage the spiral patterns.

Among the novel and inventive insights of this disclosure, control circuitry of this disclosure may track the positions where the head is to intercept the spiral patterns during the self-servo write process, and apply relatively higher values of laser pre-bias while a read/write head is in flight in between the spirals, while reducing the laser pre-bias to pattern-safe values while the read/write head is in flight over and proximate to the spiral patterns. By applying relatively higher values of laser pre-bias in between the spirals, control circuitry of this disclosure reduces thermal variations in operating conditions for the head in writing the spiral patterns, thereby enabling higher-precision and more reliable servo patterns, and on smaller scales, thereby supporting more reliable HAMR drive operation and higher data density. Control circuitry of this disclosure may reduce the laser pre-bias current back down to a pattern-safe level for exposing the spirals to when positioned in flight proximate to the spiral patterns. Control circuitry of this disclosure may thereby still enable the spirals to remain in nominal condition for accurate ongoing navigation during the servo write process, in combination with gaining the advantages of the higher laser pre-bias between the spirals for writing the servo patterns.

Control circuitry of this disclosure may thus implement novel, inventive advantages in optimizing for reliable, accurate writing of subsequently written servo patterns, optimized independently of the constraint of remaining below a spiral-safe value of pre-bias current while flying in position proximate to the spiral servo patterns, in ways not possible with conventional disk drives. Control circuitry of this disclosure may also perform related methods and techniques for building on and further optimizing such alternating laser pre-bias, such as performing per-head calibrations of boosted pre-bias current, and performing refresh writes of the spirals as needed to optimize between pre-bias current applied proximate to the spirals to enhance servo write quality and preserving the quality of the spirals, as described below. Control circuitry of this disclosure may thereby enable new capabilities for extremely accurate and reliable self-servo write processes, and thereby enable more reliable disk drive operation at smaller scales and higher data densities than is possible in conventional disk drives, among other advantages.

Various illustrative aspects are directed to a data storage device, comprising one or more disks; an actuator mechanism configured to position a selected head among one or more heads proximate to a corresponding disk surface among the one or more disks; and one or more processing devices. The one or more processing devices are configured to apply a pre-bias current to the assistive energy emitter at a first value while the selected head is positioned proximate to one or more spiral patterns on the corresponding disk surface. The one or more processing devices are further configured to apply the pre-bias current to the assistive energy emitter at a boosted value while the selected head is not positioned proximate to the one or more spiral patterns, wherein the boosted value is greater than the first value.

Various illustrative aspects are directed to a method comprising applying, with one or more processing devices, a pre-bias current to an assistive energy emitter at a first value while a selected head is positioned proximate to one or more spiral patterns on a corresponding disk surface of a data storage device; and applying, with the one or more processing devices, the pre-bias current to the assistive energy emitter at a boosted value while the selected head is not positioned proximate to the one or more spiral patterns, wherein the boosted value is greater than the first value.

Various illustrative aspects are directed to one or more processing devices comprising means for applying a pre-bias current to an assistive energy emitter at a first value while a selected head is positioned proximate to one or more spiral patterns on a corresponding disk surface of a data storage device; and means for applying the pre-bias current to the assistive energy emitter at a boosted value while the selected head is not positioned proximate to the one or more spiral patterns, wherein the boosted value is greater than the first value.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that read/write channel circuitry of control circuitry of a disk drive may perform or execute in controlling the operations of the disk drive, including for applying variable laser pre-bias current during writing of servo control patterns, and optimally boosting the laser pre-bias in between the spiral patterns to prepare for and implement inventively high-precision writing of spiral and concentric servo patterns, in accordance with aspects of the present disclosure.

FIG. 5A depicts a graph of a conventional baseline applied laser current and head temperature change for a portion of disk surface radius to be defined as a track, as a baseline reference to aid understanding the contrasting inventive behavior controlled by variable pre-bias circuitry as depicted in FIGS. 5B-5E.

FIGS. 5B and 5C depict graphs of laser current applied by variable pre-bias circuitry to a laser diode and resulting temperature change of a head for two different portions of disk surface radii to be defined as tracks, with different arrangements of intersecting spiral pattern portions and track portion designated for writing servo patterns, in accordance with aspects of this disclosure.

DETAILED DESCRIPTION

Figure 1:
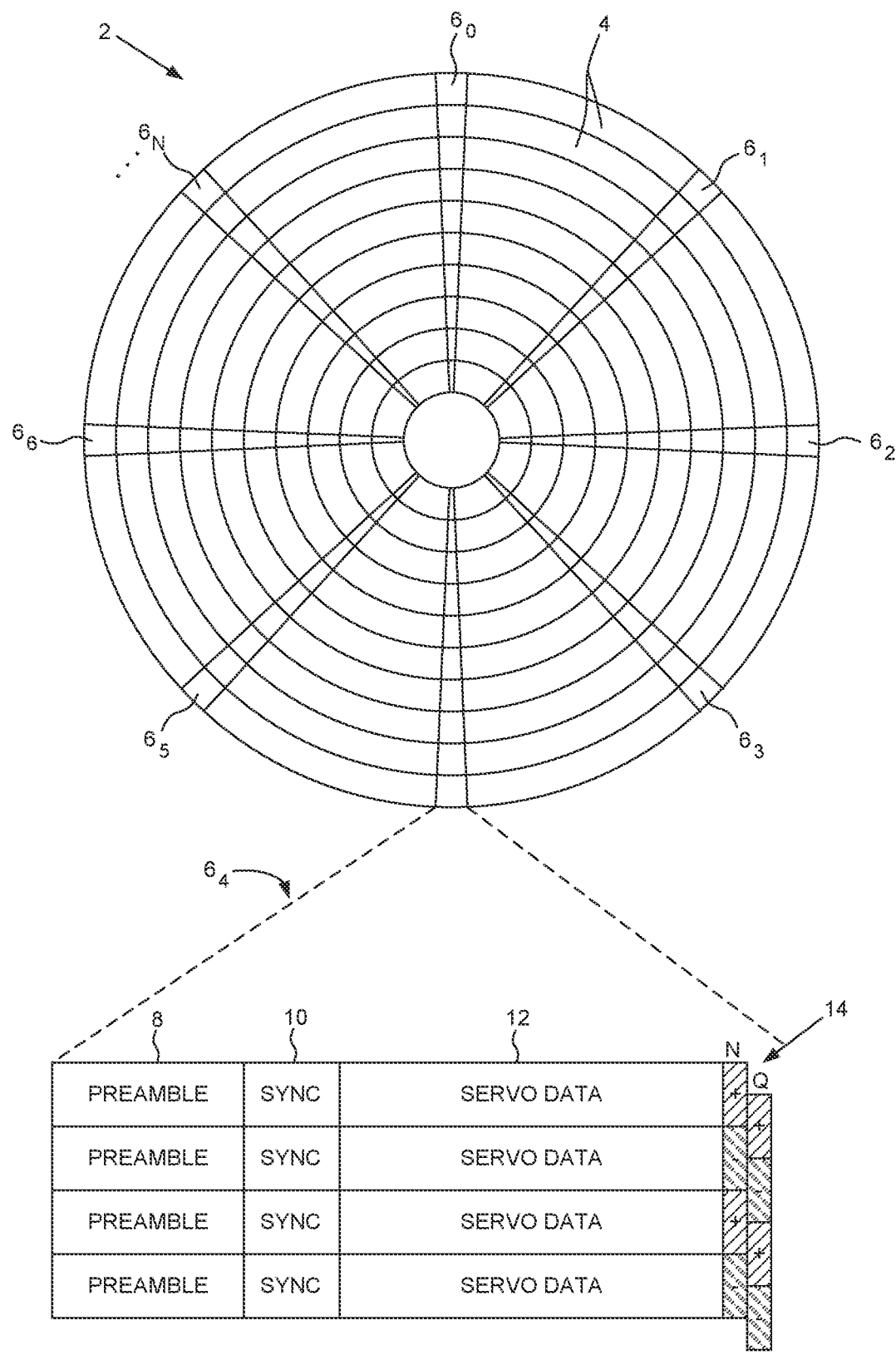
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises servo write variable laser pre-bias current circuitry 30 ("variable pre-bias circuitry 30") which applies the pre-bias current to laser diodes of read/write heads 18 ("heads 18") at a higher value when heads 18 are between spirals on the surfaces and at a pattern-safe value when heads 18 are proximate to the spirals. FIG. 2C depicts a flowchart for an example method 80 that variable pre-bias circuitry 30 of control circuitry 22 may perform or execute in controlling the operations of disk drive 15, in accordance with aspects of the present disclosure, including operations involved in applying variable laser pre-bias current during writing of servo control patterns, and optimally boosting the laser pre-bias in between the spiral patterns to prepare for and implement inventively high-precision writing of spiral and concentric servo patterns, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of heads 18 mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces.

The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in a local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actua-tors mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. If laser pre-bias is too high during writing of concentric servo patterns, it can damage bootstrap spiral control patterns that control circuitry 22 uses as a necessary initial navigational reference in a self-servo write process, when first writing concentric servo control patterns to disk surfaces 17. Conventional disk drives have thus been implemented to apply only a safe value of laser pre-bias current during writing of the concentric servo patterns, to avoid damaging the spirals during writing of the concentric servo patterns.

In contrast, variable pre-bias circuitry 30 of control circuitry 22 of this disclosure may vary the laser pre-bias to apply a more optimized laser pre-bias current while heads 18 are in flight between spirals, while still applying values of laser pre-bias that are safe for proximate spirals or other patterns ("proximate-pattern-safe" or "pattern-safe" values of laser pre-bias) while heads 18 are proximate to the spirals in their flight. In particular, variable pre-bias circuitry 30 of control circuitry 22 may apply a pre-bias current to the assistive energy emitter at a first, baseline, proximate-pattern-safe value while the selected head is positioned proximate to one or more spiral patterns on the corresponding disk surface (82). Variable pre-bias circuitry 30 may further apply the pre-bias current to the assistive energy emitter at a boosted value while the selected head is not positioned proximate to the one or more spiral patterns, wherein the boosted value is greater than the first, proximate-pattern-safe value (84). Control circuitry 22, including variable pre-bias circuitry 30, may further perform additional actions, methods, and techniques in accordance with various aspects as further described herein.

The term "variable pre-bias circuitry 30" as used herein may refer to any hardware, firmware, software, and/or combination thereof, comprised in disk drive 15, which implements, embodies, or engages in any of the structures or functions ascribed herein to variable pre-bias circuitry 30 or to any other of the novel and inventive aspects of the present disclosure. Variable pre-bias circuitry 30 may constitute any hardware, firmware, software, and/or any other elements of control circuitry 22 for applying pre-bias current to laser diodes of heads 18 at a higher value when heads 18 are between spirals on the surfaces and at a pattern-safe value when heads 18 are proximate to the spirals, and performing other techniques and methods as described herein.

To "optimize" for a given design criterion as used herein comprises seeking to improve performance in the design criterion being optimized for. To optimize for the given design criterion as used herein is not limited to achieving an ideal or maximum possible performance in the design criterion being optimized for.

Figure 3:
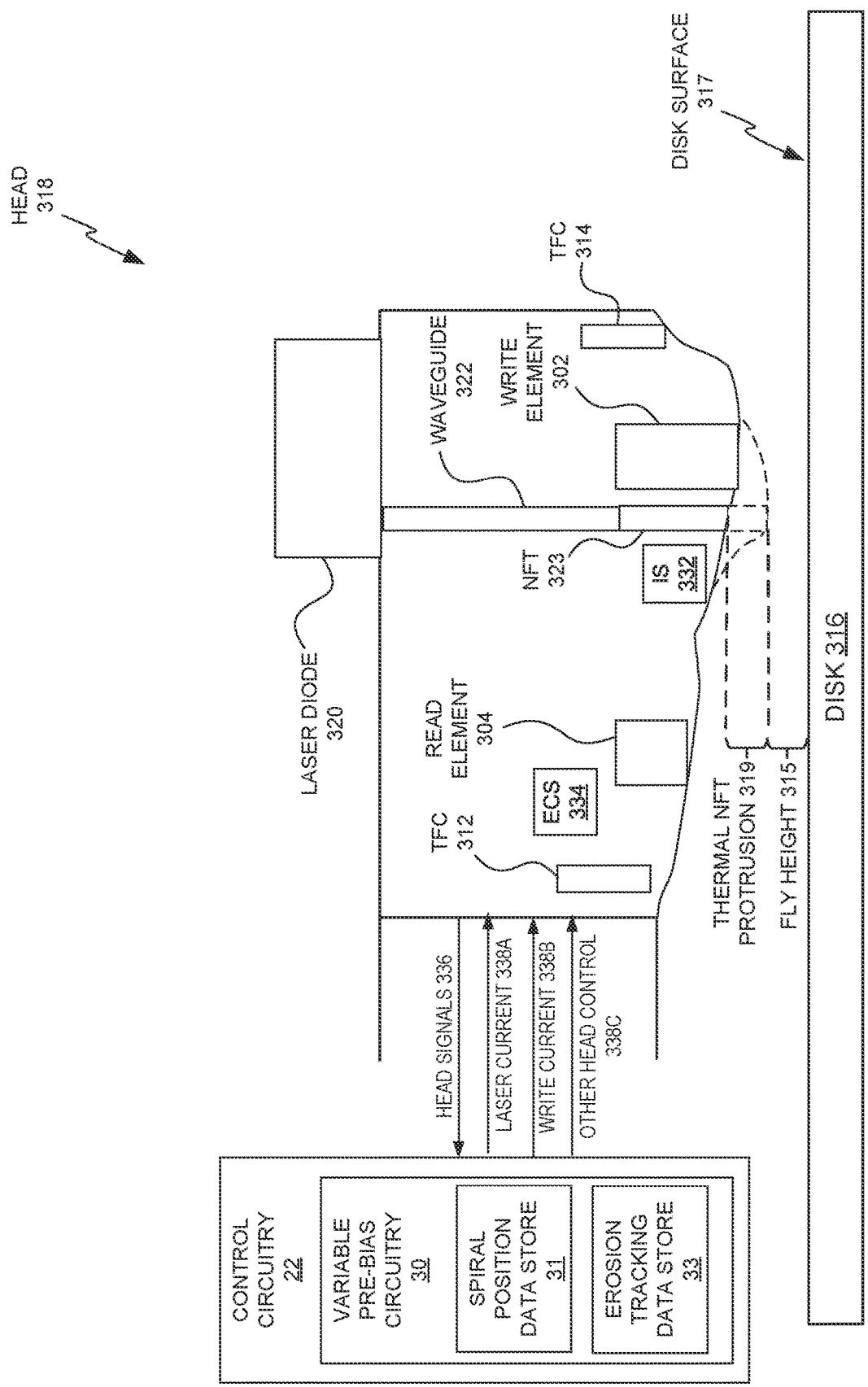
FIG. 3 depicts a conceptual side view diagram of a head of a disk drive, suspended above and operating proximate to a corresponding disk surface, and demonstrating changes in protrusion and aerodynamic profile causing changes in fly height, or head-disk spacing, due to effects such as thermally induced protrusion of the write element and the near-field transducer (NFT), in accordance with various aspects of this disclosure.

FIG. 3 depicts a conceptual side view diagram of a head 318 of a disk drive, suspended above and operating proximate to a corresponding disk surface 317 of disk 316, and demonstrating changes in protrusion and aerodynamic profile causing changes in head-disk spacing fly height 315 of head 318 above corresponding disk surface 317 due to effects such as thermally induced protrusion of the write element 302 and the near-field transducer (NFT) 323, in accordance with various aspects of this disclosure. Disk surface 317 and head 318 may be respective implementations of any of disk surfaces 17 and heads 18 as depicted in FIGS. 2A and 2B. FIG. 3 depicts an example thermal NFT protrusion 319 and aerodynamic profile causing changes in fly height 315 due to effects such as NFT pole tip protrusion (NPTP) of NFT 323 due to heating or other energizing by a laser or other energy source, in accordance with various aspects of this disclosure. FIG. 3 is a conceptual diagram and not an engineering schematic, and the elements depicted may be disposed in any of a variety of arrangements in different examples. FIG. 3 is further described in context together with FIG. 4.

Figure 4:
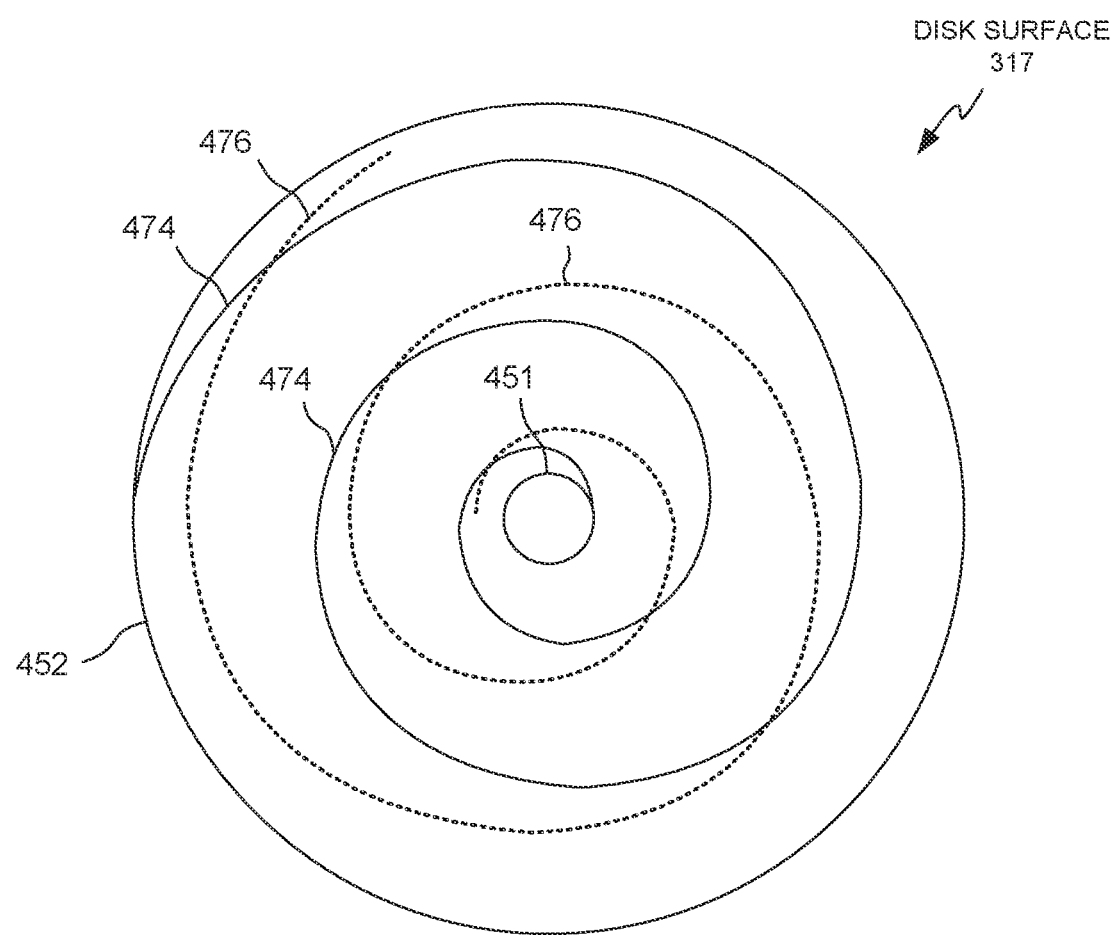
FIG. 4 depicts a simplified conceptual top plan view of a disk surface, after control circuitry has written first and second sets of spiral patterns, and before control circuitry has written concentric servo patterns, in accordance with various aspects of this disclosure.

FIG. 4 depicts a simplified conceptual top plan view of disk surface 318, after control circuitry 22 has written first and second sets of spiral patterns, and before control circuitry 22 has written concentric servo patterns, in accordance with various aspects of this disclosure. FIGS. 3 and 4 are further discussed together.

For clarity of conceptual depiction, FIG. 4 depicts only a single representative initial bootstrap spiral pattern 374 and a single representative secondary spiral pattern 376, which may be representative examples of numbers of initial and secondary bootstrap spiral patterns written between inner diameter (ID) 451 and outer diameter (OD) 452. Spirals 474, 476 may be in any suitable format, such as high frequency signals interspersed with periodic sync marks, in various examples. Control circuitry 22 may write secondary spiral patterns 476 with navigational servo reference to initial bootstrap spiral patterns 474. In different examples, control circuitry 22 may perform different numbers of iterations of writing increasingly precise spiral patterns with navigational servo reference to previously written spiral patterns, before using a final set of servo spiral patterns 476 as final spiral navigational reference for high-precision writing of the concentric servo patterns that will form the final, high-precision navigational servo reference patterns for disk drive 15 in nominal operating usage.

As depicted in FIG. 3, laser diode 320, waveguide 322, and NFT 323 together may form an example of an assistive energy emitter, which emits write-assistive energy for energy-assisted magnetic recording by head 318. Energy-assisted magnetic recording heads in other examples of this disclosure may use any other applicable form of assistive energy emitter, such as a microwave emitter for microwave-assisted magnetic recording (MAMR), as another example. Variable pre-bias circuitry 30 may apply a pre-bias current to laser diode 320 at a first, proximate-pattern-safe value of current while head 318, and in particular NFT 323 of head 318, is positioned proximate to one or more spiral patterns on corresponding disk surface 317. (The spiral patterns on disk surface 317 are not visible in the side view of FIG. 3 and are depicted in FIG. 4 and described elsewhere herein.) Variable pre-bias circuitry 30 may further apply the pre-bias current to laser diode 320 at a boosted value while head 318 is not positioned proximate to the one or more spiral patterns, such as while head 318 is positioned proximate to ranges of a track in between the spiral patterns. The boosted value of pre-bias current is greater than the first, proximate-pattern-safe value pre-bias current.

The example of FIG. 3 is further described as follows with respect to the example depicted in FIG. 3 in which the disk drive is a HAMR drive and the assistive energy emitter is implemented as laser diode 320, waveguide 322, and NFT 323. Variable pre-bias circuitry 30 may thus apply variable laser pre-bias current to laser diode 320, at proximate-pattern-safe pre-bias current values and at boosted pre-bias current values, based on when head 318 (and specifically, NFT 323) is and is not, respectively, positioned in flight proximate to the spiral patterns, as further described below.

The first, proximate-pattern-safe value of the pre-bias current is below a value at which laser diode 320 and NFT 323 would be capable of inducing significant erosion on proximate patterns (e.g., spiral patterns, servo patterns, or data) on corresponding disk surface 317. "Significant" erosion in this context may mean any non-negligible erosion, or any erosion beyond a level of erosion that disk drive 15 may compensate for, in various examples. The boosted value of the pre-bias current may be a value that variable pre-bias circuitry 30 optimizes to prepare laser diode 320 for subsequently emitting write-assistance energy (e.g., emitting a laser via NFT 323 that induces a precision plasmon) for writing a servo pattern (e.g., for writing a concentric servo pattern) to corresponding disk surface 317. Variable pre-bias circuitry 30 optimizing the boosted value of the pre-bias current to prepare laser diode 320 for subsequently emitting write-assistance laser for writing the upcoming servo pattern may thus include optimizing without regard for whether the boosted pre-bias current is enough to induce erosion or damage to any proximate patterns on disk surface 317. This is consistent with nominal operation, since variable pre-bias circuitry 30 applies the boosted pre-bias current to prepare laser diode 320 when head 318 (or when NFT 323 of head 318) is not proximate to the spiral patterns.

Control circuitry 22 outputs head control signals 338 to head 318, and receives head signals 336 (including control signals and data) from head 318. Head 318 includes a write element 302, a read element 304, thermal fly height (TFC) control elements 312 and 314, temperature sensors such as an interface sensor (IS) 332 disposed adjacent to NFT 323 and an embedded contact sensor (ECS) 334 disposed further across head 318 from NFT 323, and a laser-generating component such as a laser diode 320 configured for emitting a laser via waveguide 322 and NFT 323. The laser induces a plasmon that heats a track on disk surface 317 that passes proximate to write element 302 as head 318 flies over or proximate to disk surface 317.

Control circuitry 22 writes data to disk surface 317 by modulating a write current in an inductive write coil in write element 302, to record magnetic transitions onto corresponding disk surface 317 in a process referred to as saturation recording. During readback, read element 304 (e.g., a magneto-resistive element) in head 318 senses the magnetic transitions, and a read channel demodulates the resulting read signal. Heat-assisted magnetic recording (HAMR) enables high-quality written data at high densities enabled by a high-coercivity medium of disk surface 317, such as, e.g., superparamagnetic iron-platinum nanoparticles, by heating disk surface 317 with a laser emitted by laser diode 320 via waveguide 322 and NFT 323 during write operations. Such heating of disk surface 317 decreases the coercivity of the magnetic medium of disk surface 317, thereby enabling the magnetic field generated by the write coil of write element 302 to magnetize the temporarily heated area of disk surface 317. The disk surface encoding the data thus written then cools back down and thereby returns to heightened magnetic coercivity, which durably preserves the written data at higher density than is possible in conventional techniques such as perpendicular magnetic recording (PMR).

Disk drive 15 may use any energizing system or technique to heat the disk surface 317 in HAMR recording, such as with a laser-generating component such as laser diode 320 and NFT 323 disposed proximate to write element 302 of head 318. Since the quality of the write/read signal depends on the fly height of head 318, and various factors may interact in complex ways to induce changes to the fly height, head 318 may also comprise one or more fly height actuators (FHA) for modifying or controlling the fly height. Any type of fly height actuator may be employed, such as TFCs 312, 314 as in the example of FIG. 3, which control or influence fly height of head 318 above disk surface 317 through thermal expansion, or a piezoelectric (PZT) actuator (not included in the example of FIG. 3) that actuates through mechanical deflection, or other FHA embodiments, in other examples.

As FIG. 3 depicts, variable pre-bias circuitry 30 further comprises a spiral position data store 31. During the earlier process of control circuitry 22 writing the spiral patterns, variable pre-bias circuitry 30 may track the positions of the spiral patterns as they are being written. Variable pre-bias circuitry 30 thus compiles spiral position data store 31 as a reference data store of the positions of the one or more spiral patterns on the corresponding disk surface 317. Then, when it is time for control circuitry 22 to write the concentric servo patterns, variable pre-bias circuitry 30 is configured to read from spiral position data store 31 and to vary the laser pre-bias current it applies to laser diode 320 to a boosted pre-bias value when head 318 (or more precisely, when NFT 323) is positioned between the referenced positions of the spiral patterns 474, 476, and to a pattern-safe value when head 318 is positioned proximate to, or flying over, spiral patterns 474, 476. Variable pre-bias circuitry 30 may thus apply the laser pre-bias current at the first, pattern-safe value while the selected head 318 is positioned proximate to the one or more spiral patterns 474, 476, and apply the laser pre-bias current at the boosted value while the selected head 318 is positioned in flight proximate to portions of disk surface 317 in between concentric intersections with spiral patterns 474, 476 or otherwise not positioned proximate to the one or more spiral patterns 474, 476, based on the positions of the one or more spiral patterns 474, 476 as variable pre-bias circuitry 30 reads from spiral position data store 31.

Variable pre-bias circuitry 30 may write concentric servo patterns at each of a large number of radii along disk surface 317, thereby defining a large number of concentric data tracks around disk surface 317. At each of the radii, variable pre-bias circuitry 30 may repeat a process of consulting and reading spiral positions from spiral position data store 31 to determine the positions of intersections of spiral patterns 474, 476 with that radius on disk surface 317, and to apply a laser pre-bias current at a pattern-safe value when head 318 is in flight proximate to those intersections of spiral patterns 474, 476 with that radius, and to apply the laser pre-bias current at a boosted value when head 318 is in flight proximate to disk surface portions in between those intersections of spiral patterns 474, 476 with that radius.

Different heads 18, 318 may not be physically perfectly identical. Each individual head 18, 318 may have its own characteristic profile of how it behaves in response to application of a laser pre-bias current at different levels, within a nominal range of behavior. Different heads may emit a little higher or a little lower amplitude of laser in response to the same applied laser current, or may have different ranges of laser current in which they are relatively free of laser mode hop and behave more predictably, for example. Temperature change of laser diode 320 and other components of head 318 may also be less during writing of a concentric servo pattern than during typical data write operations in later normal operations, since each write operation to write each concentric servo pattern requires less time than a typical data write operation. In many examples, a typical data write operation takes place for orders of magnitude more time than a concentric servo pattern write operation. The likelihood of occurrence of laser mode hop is thus also less during writing of a concentric servo pattern than during typical data write operations in later normal operations. Nonetheless, variable pre-bias circuitry 30 may detect, account for, and compensate for such nominal variations in laser response behavior from one head to another during concentric servo pattern write operations.

For example, variable pre-bias circuitry 30 may be configured to calibrate the boosted value of the pre-bias current for selected head 318, prior to writing one or more servo patterns to corresponding disk surface 317. As part of calibrating the boosted value of the pre-bias current for head 318, variable pre-bias circuitry 30 may, prior to writing servo patterns to corresponding disk surface 317, apply two or more candidate values of boosted pre-bias current to laser diode 320, and measure one or more of the resulting power drawn by laser diode 320, the resulting intensity of the laser emitted by laser diode 320 via NFT 323, and whether laser diode 320 does or does not exhibit laser mode hops or is relatively more or less free of laser mode hops, at each of the candidate values of boosted pre-bias current. Variable pre-bias circuitry 30 may then select one of the candidate values of boosted pre-bias current that yields a target laser power, and which is free of or has at least a relatively reduced rate of laser mode hop, as a calibrated nominal value of boosted pre-bias current for that particular head 318. Variable pre-bias circuitry 30 may perform such a process for each of heads 18 to determine one or more custom calibrated values of boosted pre-bias current for each of heads 18, in various examples.

As noted, variable pre-bias circuitry 30 may apply pre-bias laser current at a pattern-safe value that is not at a level capable of inducing significant erosion of proximate patterns, where "significant" erosion in this context may include minor pattern erosion that variable pre-bias circuitry 30 is capable of addressing and compensating for, in some examples. Variable pre-bias circuitry 30 also includes an erosion tracking data store 33, in this example. Variable pre-bias circuitry 30 is further configured to track erosion of one or more spiral pattern portions among the one or more spiral patterns represented by illustrative spiral patterns 474, 476 due to the pre-bias current applied to laser diode 320 and the resulting laser energy emitted via NFT 323 while the selected head 318 is positioned proximate to the one or more spiral patterns 474, 476, in various examples. Variable pre-bias circuitry 30 is configured to track the erosion of the one or more spiral pattern portions in erosion tracking data store 33.

A spiral pattern portion affected by erosion may comprise one or more portions of a spiral pattern at one or more intersections of the spiral pattern with one or more of the concentric tracks that become defined by the concentric servo patterns as they are written. A given spiral pattern portion may become potentially affected by erosion even due to repeated proximate fly-by pre-bias laser emissions via NFT 323 when variable pre-bias circuitry 30 is applying generally pattern-safe values of laser pre-bias current to laser diode 320, where the laser pre-bias current is close to upper bounds of pattern-safe values. Variable pre-bias circuitry 30 is further configured to, in response to the erosion for a certain spiral pattern portion among the one or more spiral patterns 474, 476 reaching a selected erosion threshold, perform a refresh write of the certain spiral pattern portion. Variable pre-bias circuitry 30 may be further configured to track the erosion of the one or more spiral pattern portions is performed using a spiral pattern erosion data store, which may be erosion tracking data store 33 or a portion thereof.

There may not arise a substantial likelihood of significant spiral pattern erosion due to bypassing spiral patterns at pattern-safe values of laser pre-bias current, or a substantial need for performing refresh writes, since variable pre-bias circuitry 30 may need to fly head 318 over each radius, and that radius's intersections with each spiral pattern once during the writing of the concentric servo patterns. However, in the event that a given spiral pattern portion may be affected by a head flyby at a pattern-safe laser pre-bias that is more intense than nominal, or is affected by adjacent track interference by one or more encounters with the head flying over adjacent or proximate tracks at boosted laser pre-bias that is powerful enough to exert erosion across adjacent tracks, for example, the erosion tracking and refresh write by variable pre-bias circuitry 30 may address and resolve such erosion of the given spiral pattern portion.

Figure 5C:
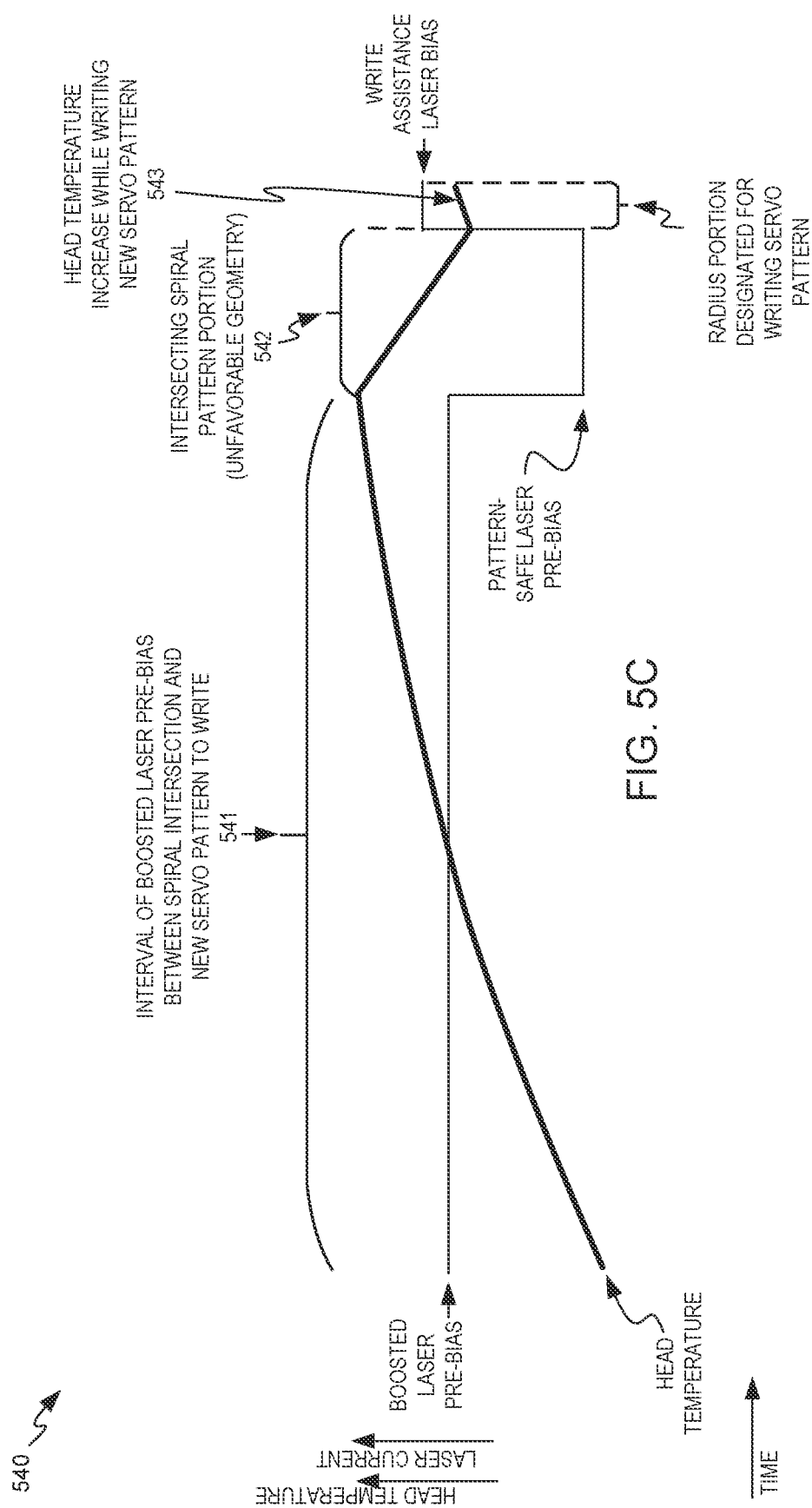

FIG. 5A depicts a graph 500 of a conventional baseline applied laser current and head temperature change for a portion of disk surface radius to be defined as a track, as a baseline reference to aid understanding the contrasting inventive behavior controlled by variable pre-bias circuitry 30 as depicted in FIGS. 5A-5E. FIGS. 5B and 5C depict graphs 520, 540 of laser current applied by variable pre-bias circuitry 30 to laser diode 320 and resulting temperature change of head 318 for two different portions of disk surface radii to be defined as tracks, with different arrangements of intersecting spiral pattern portions and track portion designated for writing servo patterns, in accordance with aspects of this disclosure. In all of FIGS. 5A-5E, head temperature is depicted in bold lines to distinguish from laser pre-bias current, which is depicted with thinner lines.

As shown in FIG. 5A, conventional control circuitry applies a baseline, conservatively pattern-safe laser pre-bias current without regard for positions of intersections of spiral patterns with the nascent track at the radius, ahead of writing a concentric servo pattern. The head temperature remains in steady-state during the steady-state application of the pattern-safe laser pre-bias current. The conventional control circuitry then applies a nominal write assistance bias current to the laser along the track interval designated for writing the servo pattern. The nominal write assistance bias current is higher than the pattern-safe laser pre-bias current, and causes the head temperature to rise at a relatively high asymptotic rate of increase during the write of the servo pattern. This is reflected in the relatively high slope of the head temperature over time during the write of the servo pattern, as depicted. This relatively high rate of increase of the head temperature during the write of the servo pattern is associated with relatively high risk of transients, laser mode hops, and other unpredictable or unstable behavior in the write assistance heating during the write of the servo pattern, leading to lower precision and lower reliability in writing the servo pattern.

FIG. 5B shows variable pre-bias circuitry 30 applying a varying laser pre-bias current at different times. Variable pre-bias circuitry 30 first applies a pattern-safe laser pre-bias current while head 318 is in flight proximate to a spiral pattern portion that is relatively distant from a subsequent track portion designated for writing a new concentric servo pattern, at 521. The head temperature reacts to the pattern-safe laser pre-bias current by remaining in steady-state at a pattern-safe temperature.

Variable pre-bias circuitry 30 then applies a boosted laser pre-bias current while head 318 is in flight along the relatively long interim disk surface portion 522 in between the spiral pattern portion and the subsequent track portion designated for writing the new concentric servo pattern. The boosted laser pre-bias current is higher than the baseline pattern-safe pre-bias current by a large proportion of the interval between the pattern-safe pre-bias current and the nominal write assistance laser bias current, in this example. The head temperature reacts to the boosted laser pre-bias current by asymptotically increasing toward almost but not quite a nominal write temperature, in this example.

Variable pre-bias circuitry 30 then applies a nominal write assistance laser bias current for writing the new concentric servo pattern, at the track portion 523 designated for writing the new concentric servo pattern. The head temperature reacts to the write assistance laser bias current by asymptotically increasing in temperature, from the relatively high temperature at the end of the boosted pre-biasing, along a new, slightly higher rate of asymptotic increase driven by the now slightly higher laser current, in this example. Because the rate of increase in the head temperature is so much lower and gentler in this example, relative to the conventional baseline as depicted in FIG. 5A, variable pre-bias circuitry 30 of this disclosure may ensure a substantially lower risk of transients, laser mode hops, or other difficult-to-predict anomalies in writing the concentric servo patterns, relative to conventional disk drives. Variable pre-bias circuitry 30 of this disclosure may thus write concentric servo patterns with greater reliability and precision, and thereby also enable higher data density, among other advantages, relative to conventional disk drives.

The example of FIG. 5B shows a relatively long, and illustratively the longest possible, interval 522 along the subject radius between the spiral pattern portion intersecting the subject radius, and the portion of the radius designated by control circuitry 22 for writing a concentric servo pattern. This example may thus be a most favorable geometry and a best-case scenario for the amount of time and flexibility variable pre-bias circuitry 30 has for applying a boosted laser pre-bias to the laser diode to condition the laser diode for subsequently writing the servo pattern. The positions of the spiral patterns are independent of the disk surface portions designated by control circuitry 22 for writing concentric servo patterns, so the disk surface portions designated for writing concentric servo patterns may occur in any arbitrary arrangement and displacement interval relative to a preceding intersecting portion of a spiral pattern with the subject radius, which constrains the duration and freedom of variable pre-bias circuitry 30 for applying a boosted laser pre-bias.

FIG. 5C shows the opposite case from FIG. 5B, in which an intersecting portion of a spiral pattern with the subject disk surface radius 542 occurs immediately prior to a disk surface portion 543 designated for writing a subsequent concentric servo pattern. In this case, variable pre-bias circuitry 30 must apply the lower, pattern-safe laser pre-bias to the laser diode during flight of the head for the interval 542 immediately prior to writing the new servo pattern at 543, as defined by the spiral pattern intersection portion of the radius. This situation may be thought of as a least favorable geometry worst-case scenario for applying a boosted laser pre-bias to the laser diode to prepare for the write operation for the new servo pattern. Variable pre-bias circuitry 30 may still, in this situation, apply the boosted laser pre-bias for the interval 541 prior to the spiral pattern intersection portion of the radius.

In various examples, including that depicted in FIG. 5C, variable pre-bias circuitry 30 may, in this less favorable situation, apply the boosted laser pre-bias at a higher boosted pre-bias value, or for a longer interval 541 prior to the spiral pattern intersection portion 542 of the radius, or both, relative to more favorable situations of the placement of the spiral pattern intersection portion ahead of the designated disk surface portion for writing the servo pattern such as that described above with reference to FIG. 5B. FIG. 5C thus depicts variable pre-bias circuitry 30 applying the boosted laser pre-bias current both with a higher value of boosted laser pre-bias current and for a longer interval of time, relative to the example of FIG. 5B, to compensate for the less favorable geometrical arrangement along the radius. As FIG. 5C depicts, this higher boosted laser pre-bias current applied for a longer interval of time drives the temperature of the head along an asymptotic increase, during the application of the boosted laser pre-bias current at 541, to a significantly higher final boosted temperature than in the example of FIG. 5B. The higher boosted laser pre-bias current applied for the longer interval drives the temperature of the head even significantly above the subsequent temperature of the head during the write process for writing the new servo pattern at 543.

With this higher temperature of the head, variable pre-bias circuitry 30 pre-compensates for the gap in boosted laser pre-bias during flight of the head proximate to the spiral pattern intersection portion. The head asymptotically cools in temperature during its flight over the spiral pattern intersection portion, while variable pre-bias circuitry 30 applies only the pattern-safe pre-bias current to the laser diode. However, the pre-compensating boosted laser pre-bias that variable pre-bias circuitry 30 applied prior to the spiral pattern intersection portion still leaves the head at close to or within the nominal write temperature range of the head when the head clears the spiral pattern intersection portion and begins flying positioned proximate to the disk surface portion designated for writing the new servo pattern, at which time variable pre-bias circuitry 30 applies the nominal write laser bias current. Variable pre-bias circuitry 30 thus causes the laser diode to emit a laser via its NFT to deliver heat-assistance for the head to perform a heat-assisted write operation for the new servo pattern, with the laser diode and the head beginning the write from close to or within the nominal temperature range of the write operation.

Variable pre-bias circuitry 30 may thus, even in this worst-case geometric arrangement of the spiral pattern intersection portion with the subject radius and the portion of the subject radius designated for writing the new servo pattern, ensure a substantially lower and steadier range of temperature change in the laser diode and the head while initiating and performing the write operation of the new servo pattern at 543, relative to conventional disk drives without boosted pre-bias between spirals. Variable pre-bias circuitry 30 of this disclosure may thus, even in this worst-case geometric arrangement, help ensure more reliable and more precise writing of the concentric servo control patterns for the disk surfaces of disk drive 15, and thereby also more reliable and precise nominal data operations and higher data density, among other advantages.

There may be an interrelated family of optimization constraints for tuning the overall performance of variable pre-bias circuitry 30 of this disclosure. As an example, upper limits on nominal laser diode operating temperatures may pose another design constraint for how high of a boosted laser pre-bias may be, in less favorable geometric arrangements of the spiral pattern intersection portions relative to the radius portions designated for writing the concentric servo patterns. As another example, different geometric arrangements of the spiral pattern intersection portions relative to the radius portions designated for writing the concentric servo patterns may result in substantially varying maximum performance capabilities in how well variable pre-bias circuitry 30 may prepare a laser diode and head for initiating and performing a write operation for writing a new servo pattern, along a spectrum between most and least favorable geometric arrangements.

Aside from how well variable pre-bias circuitry 30 may pre-bias the head for each individual servo pattern write operation, there may also be overall performance interests in constraining the variation in precision of write operation boosted pre-bias across the servo patterns collectively, and instead promoting some degree of consistency of write operation boosted pre-bias quality across the servo patterns, in some examples. In other words, variable pre-bias circuitry 30 may optimize for consistent write quality performance across all concentric servo pattern writes, even if that means giving up some write quality performance in cases of some of the most favorable geometries, for the sake of consistency of good write quality performance across all concentric servo pattern writes. Such write operation boosted pre-bias consistency across the servo patterns is constrained by the servo patterns written with the least favorable geometric arrangements for write pre-bias quality. Providing some level of constrained write boosted pre-bias consistency across the servo patterns is thus a matter of refraining from pursuing maximum possible write boosted pre-bias performance for servo patterns with more favorable geometries than a selected threshold, and instead leaving some spare boosted pre-bias performance capacity left unused. This greater boosted pre-bias consistency across servo patterns than if variable pre-bias circuitry 30 maximizes boosted pre-bias performance on each servo pattern as constrained by its geometry relative to the spiral patterns may pose some simplification of the servo read system, in some examples.

Variable pre-bias circuitry 30 may assess the geometry of the spiral pattern intersection portion on the subject radius relative to the radius portion designated for writing the servo pattern to, in terms of a lead time between the selected head being positioned proximate to the spiral pattern portion intersecting the radius, and the selected head being positioned proximate to the radius portion designated for writing the servo pattern. The radius portion subsequently becomes equivalent to a portion of the radial track, where the track is defined by the servo pattern and other servo patterns written at that radius, but it is not yet a track portion before the writing of the servo patterns. Relatively more favorable geometries for advantageously applying boosted laser pre-bias current, up to the most favorable geometry with the farthest distance between the intersecting spiral pattern portion as shown in FIG. 5B, have relatively longer lead times between the selected head being positioned proximate to a spiral pattern portion and proximate to a track portion designated for writing a servo pattern. Relatively less favorable geometries have relatively shorter lead times between the selected head being positioned proximate to the intersecting spiral pattern portion and then proximate to the track portion designated for writing a servo pattern, down to the extreme as depicted in FIG. 5C in which there is zero lead time.

Variable pre-bias circuitry 30 may be configured to determine the lead time between the selected head being positioned proximate to the intersecting spiral pattern portion and being positioned proximate to the track portion designated for writing a servo pattern. Variable pre-bias circuitry 30 may be configured to optimize the boosted value (or amplitude) and/or boosted pre-bias interval (or duration) of the boosted pre-bias current for precision performance in writing the servo pattern based on the determined lead time duration between the selected head being positioned proximate to the spiral pattern portion and proximate to the track portion designated for writing the servo pattern.

Considering a certain servo pattern, variable pre-bias circuitry 30 may further be configured to optimize the boosted value and/or interval of the pre-bias current also based on performance consistency between the certain servo pattern and other servo patterns. Variable pre-bias circuitry 30 may be further configured such that optimizing the boosted value of the pre-bias current for precision performance in writing the servo pattern based on the determined lead time duration between the selected head being positioned proximate to the spiral pattern portion and proximate to the track portion designated for writing the servo pattern, and also based on performance consistency between the certain servo pattern and other servo patterns, includes applying the pre-bias current at the boosted value for less than a full duration of the lead time, in response to the lead time being longer than a selected threshold in a possible or feasible or optimal range of lead times. Variable pre-bias circuitry 30 may be further configured such that optimizing the boosted value of the pre-bias current for precision performance in writing the servo pattern based on the determined lead time duration between the selected head being positioned proximate to the spiral pattern portion and proximate to the track portion designated for writing the servo pattern, and also based on performance consistency between the certain servo pattern and other servo patterns, includes setting the boosted value of the pre-bias current in an inversely proportional relationship to the lead time. In other words, variable pre-bias circuitry 30 may set a relatively higher boosted value of the pre-bias current in cases of a relatively shorter lead time, and a relatively lower boosted value of the pre-bias current in cases of a relatively higher lead time.

Figure 5D:
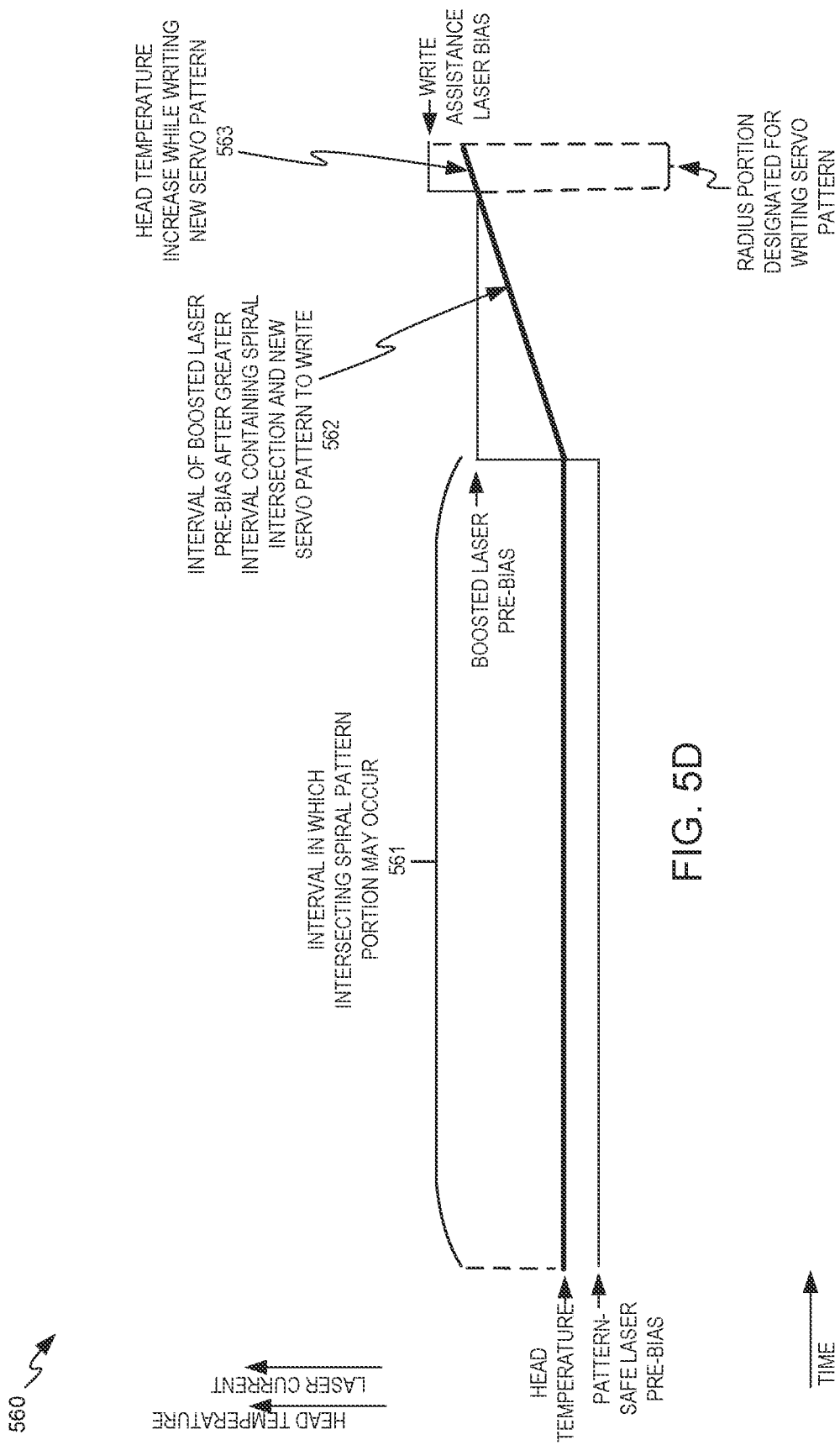
FIG. 5D depicts a graph of laser current applied by variable pre-bias circuitry to a laser diode and resulting temperature change of a head for a portion of disk surface radius to be defined as a track, with refraining from applying a maximum boosted pre-bias performance advantage in terms of moderating the increase in temperature of the head during the write operation for the new servo pattern, to cross-optimize for a constrained consistency band in boosted pre-bias and head temperature moderation performance across servo pattern write operations, in accordance with aspects of this disclosure.

FIG. 5D depicts graph 560 of laser current applied by variable pre-bias circuitry 30 to laser diode 320 and resulting temperature change of head 318 for a portion of disk surface radius to be defined as a track, with refraining from applying a maximum boosted pre-bias performance advantage in terms of moderating the increase in temperature of the head during the write operation for the new servo pattern, to cross-optimize for a constrained consistency band in boosted pre-bias and head temperature moderation performance across servo pattern write operations, in accordance with aspects of this disclosure. In the scenario depicted in FIG. 5D, the intersecting spiral pattern portion may occur anywhere across an earlier majority 561 of the range prior to the radius portion 563 designated for writing the new servo pattern, up to a determined displacement ahead of the radius portion designated for writing the new servo pattern. Variable pre-bias circuitry 30 may then apply a boosted laser pre-bias current during a minority portion 562 of the interval preparatory to the write operation for the new servo pattern, after the majority range 561 that includes the intersecting spiral pattern portion.

Variable pre-bias circuitry 30 may then apply a full write assistance laser bias during the radius portion 563 designated for writing the new servo pattern, and thereby assist in writing the new concentric servo pattern, which aids in defining the subject radius as a new track. The application of the full write assistance laser bias during the radius portion 563 designated for writing the new servo pattern induces a rate of temperature increase in the head during writing the new servo pattern at 563 which is a greater rate of increase than what variable pre-bias circuitry 30 might be capable of achieving if maximizing for performance on this servo pattern write operation only, and in the absence of seeking to constrain consistency of boosted laser pre-bias write performance across all servo pattern write operations, yet remains a substantially lower and stabler rate of temperature increase during the servo write than what is possible in conventional disk drives with no variable application of laser pre-bias preparatory to the servo pattern write operation.

Conditioning of the laser diode and the head at large may also be cumulative over the course of a number of boosted laser pre-bias applications and servo pattern write operations. The first application of boosted laser pre-bias and the subsequent first servo pattern write operation may involve a relatively greater change in operating conditions for the laser diode and the head than for subsequent applications of boosted laser pre-bias and the servo pattern write operations. Variable pre-bias circuitry 30 may take this cumulative evolution of operating conditions of the laser diode and head into account and compensate for it, such as by applying a reduced boosted laser pre-bias ahead of subsequent servo pattern write operations relative to a first servo pattern write operation. In a particular example, the first-applied boosted value of the pre-bias current is a first boosted value for writing a first servo pattern, and variable pre-bias circuitry 30 is further configured to set the boosted value of the pre-bias current to a second boosted value, while the selected head is in flight between the intersecting spiral pattern portion and the radius portion designated for writing the next servo pattern, or otherwise not positioned proximate to the one or more spiral patterns, to prepare for writing a second servo pattern, wherein the second boosted value is less than the first boosted value.

As noted above, the assistive energy emitter may comprise a laser diode, or other laser emission component. Variable pre-bias circuitry 30 may be further configured to identify an operating temperature interval window of the laser diode or other laser emission component that has a relatively reduced incidence of laser mode hops. Variable pre-bias circuitry 30 may be further configured to optimize operating parameters of the selected head based on maintaining an operating temperature of the laser emission component within the operating temperature interval window that has the relatively reduced incidence of laser mode hops.

Variable pre-bias circuitry 30 may be further configured such that optimizing the operating parameters of the selected head based on maintaining the operating temperature of the laser emission component within the operating temperature interval window that has the relatively reduced incidence of laser mode hops comprises optimizing any one or more of: the boosted value and interval of the boosted pre-bias current, an overshoot of an operating temperature of the laser emission component prior to a servo write operation, a write time of the servo write operation, a preamble length of the servo write operation, and a write current applied to a write element comprised in the selected head for the servo write operation. Variable pre-bias circuitry 30 may be further configured to detect and assess the operating temperature profile of the head by reading and comparing temperature sensor inputs from two or more temperature sensors positioned on the head at different distances from the NFT, such as from IS 332 disposed adjacent to NFT 323 and ECS 334 disposed farther from NFT 323 as shown in FIG. 3 and described above. Variable pre-bias circuitry 30 may be further configured such that identifying the operating temperature interval window of the laser emission component that has a relatively reduced incidence of laser mode hops comprises reading the temperature sensor signals from a first sensor such as IS 332 disposed in the selected head proximate to the assistive energy emitter and a second sensor such as ECS 334 disposed in the selected head relatively further away from the assistive energy emitter, and determining a differential between the temperature sensor signals from IS 332 and ECS 334, such as by subtracting one of the temperature sensor signals from the other, in various examples. The differential between the temperature sensor signals may enable canceling out some noise in common and enable sensing temperature with higher signal-to-noise ratio (SNR) in various examples.

In some examples, variable pre-bias circuitry 30 may comprise a pre-amplifier and a pre-amplifier mode pin that controls the pre-bias current, at one or both of the pattern-safe and boosted values of laser pre-bias. Variable pre-bias circuitry 30 may be further configured such that applying the pre-bias current to the assistive energy emitter at the boosted value while the selected head is not positioned proximate to the one or more spiral patterns comprises controlling the pre-amplifier mode pin to enable applying the pre-bias current to the assistive energy emitter at the boosted value.

Variable pre-bias circuitry 30 may use the per-track average boosted pre-bias to regulate the laser diode temperature, allowing the laser to operate at a temperature that has no or low laser mode hop, while the boosted pre-bias per concentric servo wedge reduces the laser's transient temperature change on top of the laser diode temperature during the writing of each concentric servo wedge. This may help to keep the laser temperature within the no or low laser mode hop temperature range. For the purpose of per-wedge transient temperature reduction, at the same bias boost value (or level, or amplitude) and interval (or duration), the boosted pre-bias that variable pre-bias circuitry 30 applies immediately before the write of the concentric servo pattern is the most effective interval of boosted laser pre-bias. For the purpose of laser body temperature control, spreading out the extra boost in laser pre-bias evenly and within a consistency range to each servo wedge may be advantageous in some examples. In view of this, in a simple illustrative example for operating the boosted pre-bias, variable pre-bias circuitry 30 may select a boosted pre-bias amplitude that is safe, apply the selected boosted pre-bias while the head is approaching each write of a concentric servo wedge in a default boosted pre-bias interval as close as the spiral placement and usage allow, and adjust the boosted pre-bias interval to achieve a target laser temperature range. In cases in which a spiral pattern occurs within or overlapping with the default boosted pre-bias interval, variable pre-bias circuitry 30 may apply two separate intervals of boosted pre-bias on either side of the spiral pattern on the approach to the position for writing the concentric servo pattern, an example of which is depicted in FIG. 5E.

Figure 5E:
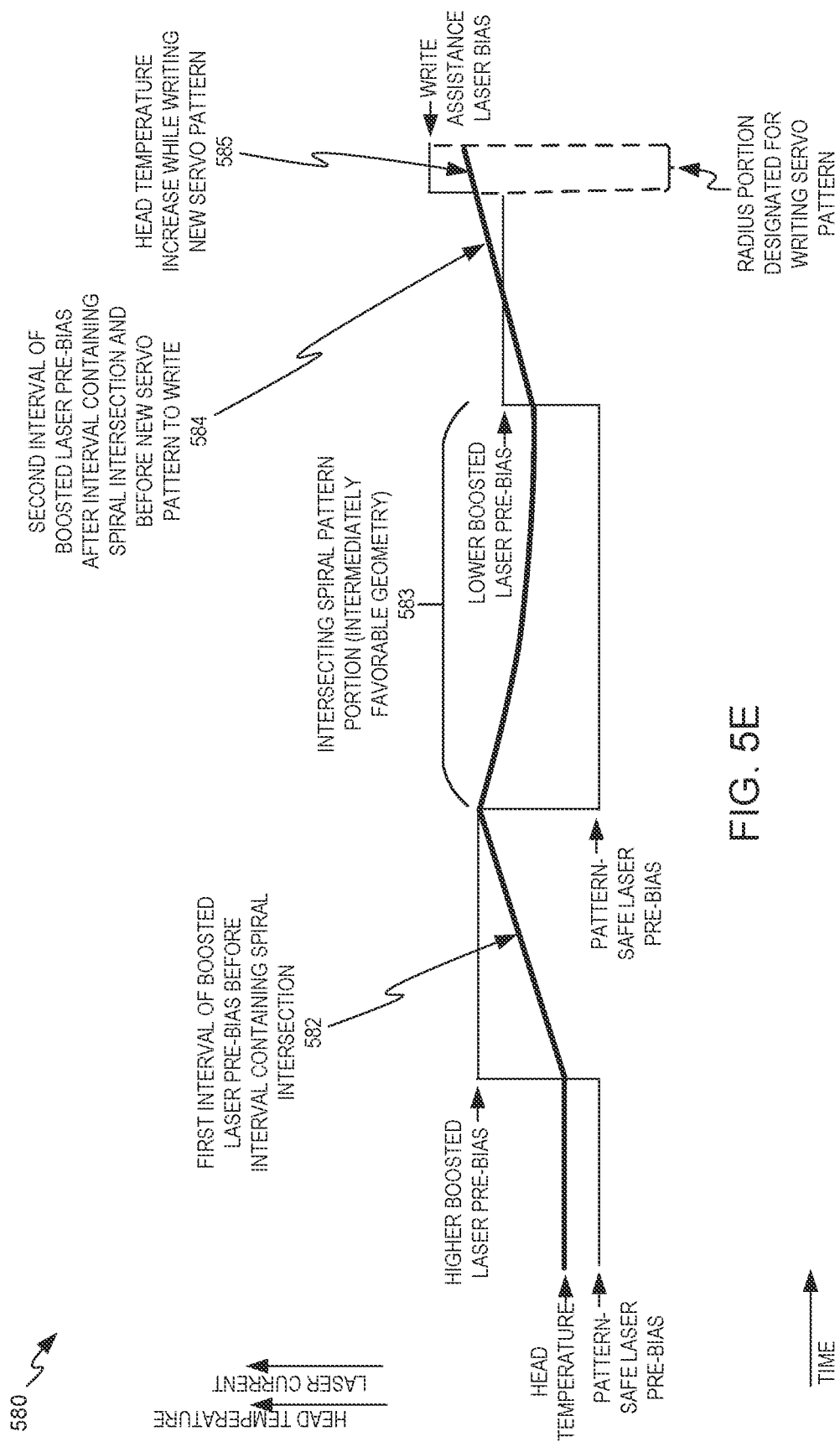
FIG. 5E depicts a graph of another example of laser current applied by variable pre-bias circuitry to a laser diode and resulting temperature change of a head for a portion of disk surface radius to be defined as a track, in an example with intermediately favorable geometry of the spiral intersection relative to the upcoming servo pattern, in accordance with aspects of this disclosure.

FIG. 5E depicts graph 580 of another example of laser current applied by variable pre-bias circuitry 30 to laser diode 320 and resulting temperature change of head 318 for a portion of disk surface radius to be defined as a track, in an example with intermediately favorable geometry of the spiral intersection 583 relative to the upcoming servo pattern, in accordance with aspects of this disclosure. In this example in which the potential area of spiral pattern intersection is in an intermediate portion 583 of the area between concentric servo patterns, variable pre-bias circuitry 30 may optimize amplitude and interval of boosted laser pre-bias by applying two separate intervals 582, 584 of boosted laser pre-bias, both before and after the interval 583 in which the intersecting spiral pattern occurs. As shown in FIG. 5E, the first interval 582 of boosted laser pre-bias may steadily raise the head temperature. The head temperature may then asymptotically decline during the interval 583 in which variable pre-bias circuitry 30 refrains from applying boosted pre-bias to avoid potentially interfering with the intersecting spiral pattern, though the head temperature still remains at an elevated value at the end of the spiral pattern interval 583, relative to its baseline pre-bias temperature prior to the first interval 582 of boosted pre-bias. Variable pre-bias circuitry 30 then applies the boosted pre-bias laser again in a second interval 584 between the spiral pattern interval 583 and the subsequent interval 585 designated for writing the concentric servo pattern. Since this second interval 584 of boosted laser pre-bias begins from a still pre-elevated temperature state that variable pre-bias circuitry 30 accomplished with the first interval 582 of boosted pre-bias, variable pre-bias circuitry 30 has less additional heating of the head still to do in the second interval 584 of boosted pre-bias to optimize the head temperature ahead of performing the write of the concentric servo pattern at 585.

In some examples, this may enable or motivate variable pre-bias circuitry 30 to optimize the amplitude of boosted pre-bias current at a lower value during the second interval 584 of boosted laser pre-bias relative to the value of current variable pre-bias circuitry 30 applies during the first interval 582 of boosted laser pre-bias. In some examples, variable pre-bias circuitry 30 may optimize the amplitude of boosted pre-bias current at the same or a higher value during the second interval of boosted laser pre-bias relative to the value of current variable pre-bias circuitry 30 applies during the first interval of boosted laser pre-bias. These serve as further illustrative example of boosted laser pre-bias using criteria for optimizing both the value or amplitude of current applied in the boosted laser pre-bias and the one or more durations or interval timings of applying the boosted laser pre-bias, in service of selected performance criteria such as some combination of minimizing temperature change of the head during the writing of the concentric servo patterns, and minimizing variation in temperature change of the head across the writing of the concentric servo patterns, in various examples. In other words, variable pre-bias circuitry 30 may refrain from applying a maximum boosted pre-bias performance advantage in a particular concentric servo pattern write in terms of moderating the increase in temperature of the head during the write operation for the new concentric servo pattern, to cross-optimize for a constrained consistency band in boosted pre-bias and head temperature moderation performance across concentric servo pattern write operations, in various examples.

While all of the examples described above address applying boosted laser pre-bias while avoiding overwriting or otherwise damaging intersections with spiral patterns, in further examples, variable pre-bias circuitry 30 may address certain unfavorable geometries by selectively applying an interval of boosted laser pre-bias during intersection of the head's flight with a spiral pattern, despite the risk or likelihood of damaging or fully overwriting the spiral pattern at that intersection. Such applying of boosted pre-bias while the head is intersecting the spiral pattern may be referred to as blanking the spiral pattern. In an example of an unfavorable geometry as depicted in FIG. 5C in which the spiral pattern intersection is immediately adjacent to the position designated for writing the concentric servo pattern, or in which the spiral pattern intersection is otherwise proximate to the position designated for writing the concentric servo pattern, variable pre-bias circuitry 30 may assess the geometry against optimization criteria for a potential amplitude and interval of applying boosted laser pre-bias to pre-heat the head preparatory to writing the concentric servo pattern, and where the optimization criteria may also include a cost-benefit analysis of applying the boosted pre-bias in an interval likely to damage or blank the spiral pattern intersection.

Variable pre-bias circuitry 30 may also assess optimization criteria for surrounding servo patterns, such as whether the previous one or more concentric servo wedges have full spiral pattern feedback from remaining intact spiral patterns, which may make the damage or loss of the one spiral pattern intersection tolerable, and a worthwhile tradeoff for being able to write a new concentric servo pattern with the benefit of a fully optimized boosted laser pre-bias. In some examples, variable pre-bias circuitry 30 may assess and determine, as the result of a multi-constraint optimization that to achieve overall superior subsequent servo navigation, to apply a boosted laser pre-bias in an interval immediately prior to the area designated for writing the concentric servo pattern, with an interval and amplitude that are optimized for writing the concentric servo pattern and without regard for an intersecting spiral pattern in the same interval. In other examples, variable pre-bias circuitry 30 may also cross-optimize between the quality of the new concentric servo pattern and potential risk to the intersecting spiral pattern, and may apply a moderately or slightly boosted laser pre-bias over a conservatively safe amplitude of laser pre-bias while the head is in flight proximate to at least a portion of an intersecting spiral pattern, to help promote write quality of the new concentric servo pattern while possibly imposing limited erosion but not a complete blanking of the spiral pattern intersection. Variable pre-bias circuitry 30 may thus determine that write quality for a particular concentric servo pattern to write is a higher priority than preserving write quality of a particular spiral pattern intersection comprised in the one or more spiral patterns on the corresponding disk surface, where the particular spiral pattern intersection is proximate to an area designated for writing the particular concentric servo pattern; and apply the pre-bias current to the assistive energy emitter at a second boosted value while the selected head is positioned proximate to another spiral pattern on the corresponding disk surface, wherein the second boosted value may be the same as or different than the first boosted value.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position a selected head among one or more heads proximate to a corresponding disk surface among the one or more disks, wherein the selected head comprises a write element and an assistive energy emitter for write assistance; and
   one or more processing devices, wherein the one or more processing devices are configured to:
      apply a pre-bias current to the assistive energy emitter at a first value while the selected head is positioned proximate to one or more spiral patterns on the corresponding disk surface, and
      apply the pre-bias current to the assistive energy emitter at a boosted value while the selected head is not positioned proximate to the one or more spiral patterns, wherein the boosted value is greater than the first value.

2. The data storage device of claim 1, wherein the first value of the pre-bias current is below a value at which the assistive energy emitter would be capable of inducing significant erosion on proximate patterns on the corresponding disk surface.

3. The data storage device of claim 1, wherein the boosted value of the pre-bias current is optimized to prepare the assistive energy emitter for subsequently emitting write-assistance energy for writing a servo pattern to the corresponding disk surface.

4. The data storage device of claim 1, wherein the one or more processing devices are further configured to:
   read from a reference data store of positions of the one or more spiral patterns on the corresponding disk surface, wherein applying the pre-bias current at the first value while the selected head is positioned proximate to the one or more spiral patterns and applying the pre-bias current at the boosted value while the selected head is not positioned proximate to the one or more spiral patterns are based on the positions of the one or more spiral patterns read from the reference data store.

5. The data storage device of claim 1, wherein the one or more processing devices are further configured to calibrate the boosted value of the pre-bias current for the selected head, prior to writing one or more servo patterns to the corresponding disk surface.

6. The data storage device of claim 1, wherein the one or more processing devices are further configured to:
   track erosion of one or more spiral pattern portions among the one or more spiral patterns due to the pre-bias current applied to the assistive energy emitter while the selected head is positioned proximate to the one or more spiral patterns; and in response to the erosion for a certain spiral pattern portion among the one or more spiral patterns reaching a selected erosion threshold, perform a refresh write of the certain spiral pattern portion.

7. The data storage device of claim 6, wherein the one or more processing devices are further configured such that tracking the erosion of the one or more spiral pattern portions is performed using a spiral pattern erosion data store.

8. The data storage device of claim 1, wherein the one or more processing devices are further configured to:

determine a lead time between the selected head being positioned proximate to a spiral pattern portion and proximate to a radius portion of the corresponding disk surface designated for writing a servo pattern; and optimize one or more of the boosted value and a boosted pre-bias interval of the pre-bias current for writing the servo pattern based on the determined lead time duration between the selected head being positioned proximate to the spiral pattern portion and proximate to the radius portion designated for writing the servo pattern.

9. The data storage device of claim 8, wherein the servo pattern comprises a certain servo pattern, and wherein the one or more processing devices are further configured to:

optimize the boosted value of the pre-bias current also based on performance consistency between the certain servo pattern and other servo patterns.

10. The data storage device of claim 9, wherein the one or more processing devices are further configured such that optimizing the boosted value of the pre-bias current also based on performance consistency between the certain servo pattern and other servo patterns comprises applying the pre-bias current at the boosted value for less than a full duration of the lead time, in response to the lead time being longer than a selected threshold in a possible range of lead times.

11. The data storage device of claim 9, wherein the one or more processing devices are further configured such that optimizing the boosted value of the pre-bias current also based on performance consistency between the certain servo pattern and other servo patterns comprises setting the boosted value of the pre-bias current in an inversely proportional relationship to the lead time.

12. The data storage device of claim 1, wherein the boosted value of the pre-bias current is a first boosted value for writing a first servo pattern, wherein the one or more processing devices are further configured to set the boosted value of the pre-bias current to a second boosted value, while the selected head is not positioned proximate to the one or more spiral patterns, to prepare for writing a second servo pattern, wherein the second boosted value is less than the first boosted value.

13. The data storage device of claim 1, wherein the assistive energy emitter comprises a laser emission component, and wherein the one or more processing devices are further configured to:

identify an operating temperature interval window of the laser emission component that has a relatively reduced incidence of laser mode hops; and optimize operating parameters of the selected head based on maintaining an operating temperature of the laser emission component within the operating temperature interval window that has the relatively reduced incidence of laser mode hops.

14. The data storage device of claim 13, wherein the one or more processing devices are further configured such that optimizing the operating parameters of the selected head based on maintaining the operating temperature of the laser emission component within the operating temperature interval window that has the relatively reduced incidence of laser mode hops comprises optimizing any one or more of the boosted value of the pre-bias current, one or more intervals of the boosted pre-bias current, an overshoot of an operating temperature of the laser emission component prior to a servo write operation, a write time of the servo write operation, a preamble length of the servo write operation, and a write current applied to a write element comprised in the selected head for the servo write operation.

15. The data storage device of claim 13, wherein the one or more processing devices are further configured such that identifying the operating temperature interval window of the laser emission component that has the relatively reduced incidence of laser mode hops comprises reading temperature sensor signals from a first sensor disposed in the selected head proximate to the assistive energy emitter and a second sensor disposed in the selected head relatively further away from the assistive energy emitter, and determining a differential between the temperature sensor signals.

16. The data storage device of claim 1, wherein the one or more processing devices are further configured such that applying the pre-bias current to the assistive energy emitter at the boosted value while the selected head is not positioned proximate to the one or more spiral patterns comprises controlling a pre-amplifier mode pin to enable applying the pre-bias current to the assistive energy emitter at the boosted value.

17. The data storage device of claim 1, wherein the boosted value is a first boosted value, wherein the one or more processing devices are further configured to:

determine that write quality for a particular concentric servo pattern to write is a higher priority than preserving write quality of a particular spiral pattern intersection comprised in the one or more spiral patterns on the corresponding disk surface, where the particular spiral pattern intersection is proximate to an area designated for writing the particular concentric servo pattern; and apply the pre-bias current to the assistive energy emitter at a second boosted value while the selected head is positioned proximate to another spiral pattern on the corresponding disk surface, wherein the second boosted value may be the same as or different than the first boosted value.

18. A method comprising:

applying, with one or more processing devices, a pre-bias current to an assistive energy emitter at a first value while a selected head is positioned proximate to one or more spiral patterns on a corresponding disk surface of a data storage device; and applying, with the one or more processing devices, the pre-bias current to the assistive energy emitter at a boosted value while the selected head is not positioned proximate to the one or more spiral patterns, wherein the boosted value is greater than the first value.

19. The method of claim 18, wherein the first value of the pre-bias current is below a value at which the assistive energy emitter would be capable of inducing significant erosion on proximate patterns on the corresponding disk surface, and wherein the boosted value of the pre-bias current is optimized to prepare the assistive energy emitter for subsequently emitting write-assistance energy for writing a servo pattern to the corresponding disk surface.

20. One or more processing devices comprising:

means for applying a pre-bias current to an assistive energy emitter at a first value while a selected head is positioned proximate to one or more spiral patterns on a corresponding disk surface of a data storage device; and means for applying the pre-bias current to the assistive energy emitter at a boosted value while the selected head is not positioned proximate to the one or more spiral patterns, wherein the boosted value is greater than the first value.

* * * * *